(12) United States Patent
Ding et al.

(10) Patent No.: US 10,909,319 B2
(45) Date of Patent: Feb. 2, 2021

(54) ENTITY LINKING METHOD, ELECTRONIC DEVICE FOR PERFORMING ENTITY LINKING, AND NON-TRANSITORY COMPUTER-READABLE RECORDING MEDIUM

(71) Applicants: Lei Ding, Beijing (CN); Yixuan Tong, Beijing (CN); Bin Dong, Beijing (CN); Shanshan Jiang, Beijing (CN); Yongwei Zhang, Beijing (CN)

(72) Inventors: Lei Ding, Beijing (CN); Yixuan Tong, Beijing (CN); Bin Dong, Beijing (CN); Shanshan Jiang, Beijing (CN); Yongwei Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 229 days.

(21) Appl. No.: 16/242,365

(22) Filed: Jan. 8, 2019

(65) Prior Publication Data
US 2019/0251164 A1 Aug. 15, 2019

(30) Foreign Application Priority Data
Feb. 12, 2018 (CN) .......................... 2018 1 0146229

(51) Int. Cl.
*G06F 16/22* (2019.01)
*G07F 7/00* (2006.01)
(Continued)

(52) U.S. Cl.
CPC .......... *G06F 40/279* (2020.01); *G06F 16/313* (2019.01); *G06F 16/353* (2019.01); *G06K 9/6256* (2013.01)

(58) Field of Classification Search
CPC .................................. G06F 16/22; G06F 16/00
See application file for complete search history.

(56) References Cited

U.S. PATENT DOCUMENTS

| 8,244,726 B1* | 8/2012 | Matesso ................. G06F 16/22 707/734 |
| 2015/0286747 A1* | 10/2015 | Anastasakos ....... G06F 16/9017 707/776 |

(Continued)

OTHER PUBLICATIONS

Avirup Sil et al., "One for All: Towards Language Independent Named Entity Linking", IBM T. J. Watson Research Center, NY, Proceeding of the 54th Annual Meeting of the Association for Computational Linguistics, pp. 2255-2264, Aug. 7-12, 2016.

*Primary Examiner* — Shreyans A Patel
(74) *Attorney, Agent, or Firm* — IPUSA, PLLC

(57) ABSTRACT

A method, an apparatus and an electronic device for performing entity linking, and a non-transitory computer-readable recording medium are provided. The method includes constructing training data including a plurality of sets of labeled data using an existing unambiguous entity database where unambiguous entities corresponding to respective entity words are stored, each set of the labeled data including a text having an entity word and an unambiguous entity linked with the entity word; training an unambiguous entity recognition model whose output is a matching probability between an entity word in a text and an unambiguous entity using the training data; and inputting a text having an entity word to be recognized into the unambiguous entity recognition model, and determining an unambiguous entity linked with the entity word to be recognized based on an output result of the unambiguous entity recognition model.

15 Claims, 8 Drawing Sheets

(51) Int. Cl.
*G07F 17/30* (2006.01)
*G06F 40/279* (2020.01)
*G06F 16/35* (2019.01)
*G06F 16/31* (2019.01)
*G06K 9/62* (2006.01)

(56) References Cited

U.S. PATENT DOCUMENTS

2018/0082197 A1* 3/2018 Aravamudan ........... G06N 5/04
2018/0288477 A1* 10/2018 Gupta ................ H04N 21/4316
2019/0251164 A1* 8/2019 Ding .................... G06F 40/134

* cited by examiner

The Ricoh Company, Ltd. (株式会社リコー Kabushiki-gaisha Rikō) is a Japanese [multinational] imaging and [electronics] [company].

The Ricoh Company, Ltd. (株式会社リコー Kabushiki-gaisha Rikō) is a Japanese [multinational] imaging and [E0002] [company].

The Ricoh Company, Ltd. (株式会社リコー Kabushiki-gaisha Rikō) is a Japanese [E0001] imaging and [electronics] [E0003].

ENTITY LINKING METHOD, ELECTRONIC DEVICE FOR PERFORMING ENTITY LINKING, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 201810146229.4 filed on Feb. 12, 2018, the entire contents of which are incorporated herein by reference.

BACKGROUND OF THE INVENTION

1. Field of the Invention

The present invention relates to the field of data processing, and specifically, a method, an apparatus and an electronic device for performing entity linking, and a non-transitory computer-readable recording medium.

2. Description of the Related Art

With the rapid development of the Internet semantic knowledge base and the text information platform, linking entity words in text information to respective unambiguous entities in an Internet semantic knowledge base can provide a powerful entity disambiguation system for supporting tasks such as information retrieval and extraction, and knowledge engineering. In a conventional entity linking method, it is necessary to manually perform labeling and determine datasets in a target language as training data, namely, labor costs rise due to labeling of training data.

SUMMARY OF THE INVENTION

According to an aspect of the present invention, an entity linking method is provided. The entity linking method includes constructing, using an existing unambiguous entity database where one or more unambiguous entities corresponding to one or more respective entity words are stored, training data including a plurality of sets of labeled data, each set of the labeled data including a text having an entity word and an unambiguous entity linked with the entity word; training, using the training data, an unambiguous entity recognition model whose output is a matching probability between an entity word in a text and an unambiguous entity; and inputting a text having an entity word to be recognized into the unambiguous entity recognition model, and determining, based on an output result of the unambiguous entity recognition model, an unambiguous entity linked with the entity word to be recognized.

According to another aspect of the present invention, an electronic device for performing entity linking is provided. The electronic device includes a memory storing computer-readable instructions; and one or more processors configured to execute the computer-readable instructions such that the one or more processors are configured to construct, using an existing unambiguous entity database where one or more unambiguous entities corresponding to one or more respective entity words are stored, training data including a plurality of sets of labeled data, each set of the labeled data including a text having an entity word and an unambiguous entity linked with the entity word; train, using the training data, an unambiguous entity recognition model whose output is a matching probability between an entity word in a text and an unambiguous entity; and input a text having an entity word to be recognized into the unambiguous entity recognition model, and determine, based on an output result of the unambiguous entity recognition model, an unambiguous entity linked with the entity word to be recognized.

According to another aspect of the present invention, a non-transitory computer-readable recording medium having computer-executable instructions for execution by a processing system is provided. The computer-executable instructions, when executed, cause the processing system to carry out an entity linking method. The entity linking method includes constructing, using an existing unambiguous entity database where one or more unambiguous entities corresponding to one or more respective entity words are stored, training data including a plurality of sets of labeled data, each set of the labeled data including a text having an entity word and an unambiguous entity linked with the entity word; training, using the training data, an unambiguous entity recognition model whose output is a matching probability between an entity word in a text and an unambiguous entity; and inputting a text having an entity word to be recognized into the unambiguous entity recognition model, and determining, based on an output result of the unambiguous entity recognition model, an unambiguous entity linked with the entity word to be recognized.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention.

In view of the problem of the conventional technology, embodiments of the present invention have an object to provide a method, an apparatus and an electronic device for performing entity linking, and a non-transitory computer-readable recording medium that can link an entity word in text information to an unambiguous entity.

First Embodiment

Figure 1:
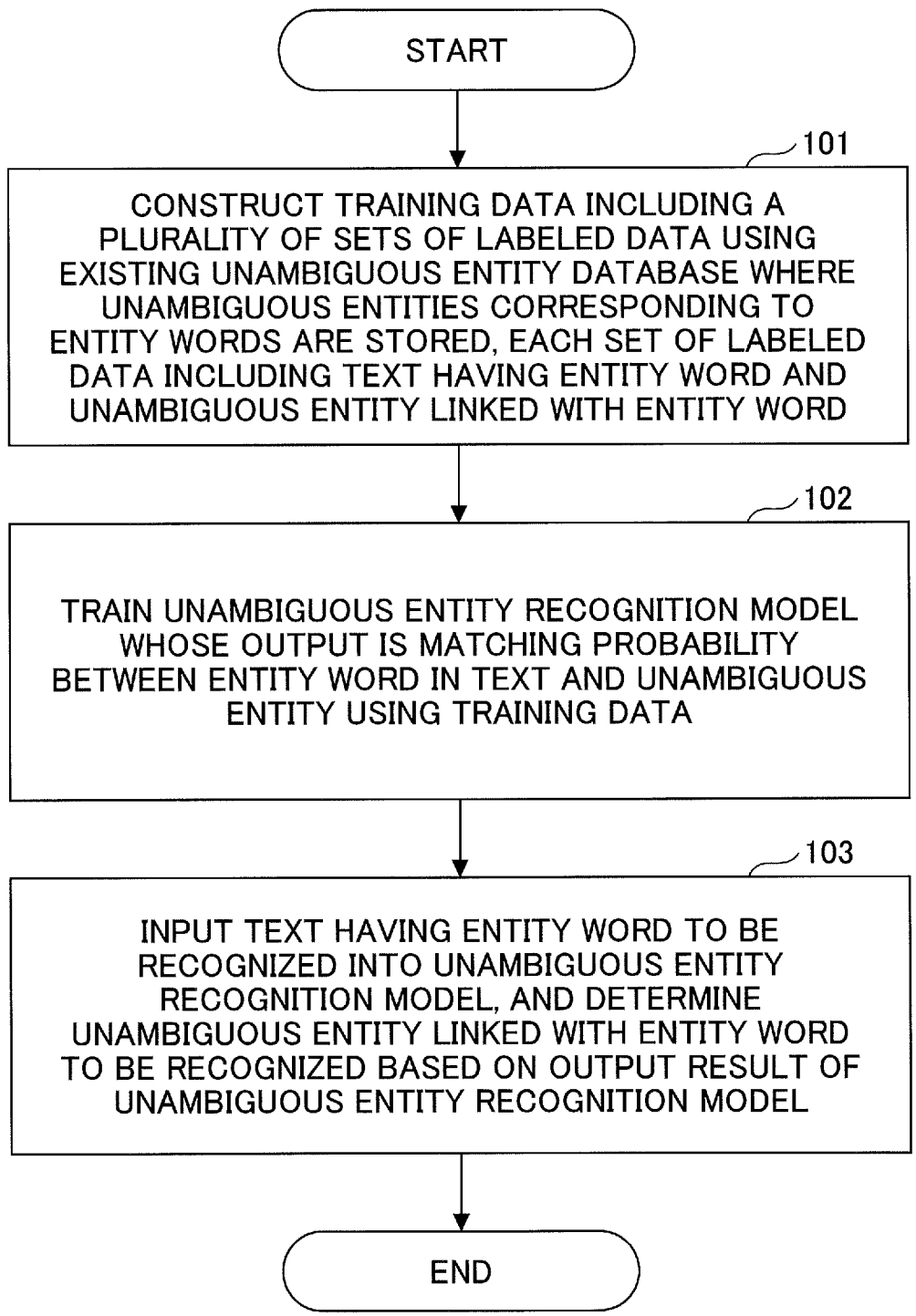
FIG. 1 is a flowchart illustrating an entity linking method according to an embodiment of the present invention.

The present embodiment provides an entity linking method. As illustrated in FIG. 1, the entity linking method includes steps 101 to 103.

Step 101: construct training data using an existing unambiguous entity database. In the existing unambiguous entity database, one or more unambiguous entities corresponding to one or more respective entity words are stored. The training data includes a plurality of sets of labeled data, and each set of the labeled data includes a text having an entity word and an unambiguous entity linked with the entity word.

Step 102: train an unambiguous entity recognition model using the training data. The unambiguous entity recognition model can output a matching probability between an entity word in a text and an unambiguous entity.

Step 103: input a text having an entity word to be recognized into the unambiguous entity recognition model, and determine an unambiguous entity linked with the entity word to be recognized based on an output result of the unambiguous entity recognition model.

In the present embodiment, training data is constructed using an existing unambiguous entity database, the training data includes a plurality of sets of labeled data, and each set of the labeled data includes a text having an entity word and an unambiguous entity linked with the entity word; an unambiguous entity recognition model is trained using the training data, the unambiguous entity recognition model can output a matching probability between an entity word in a text and an unambiguous entity; and a text having an entity word to be recognized is input into the unambiguous entity recognition model, and an unambiguous entity linked with the entity word to be recognized is determined based on an output result of the unambiguous entity recognition model. In this way, the unambiguous entity recognition model can be obtained by training without manual labeling, and an entity word in text information can be linked to an unambiguous entity using the unambiguous entity recognition model. Thus, it is possible to improve the degree of automation of entity linking.

Figure 2:
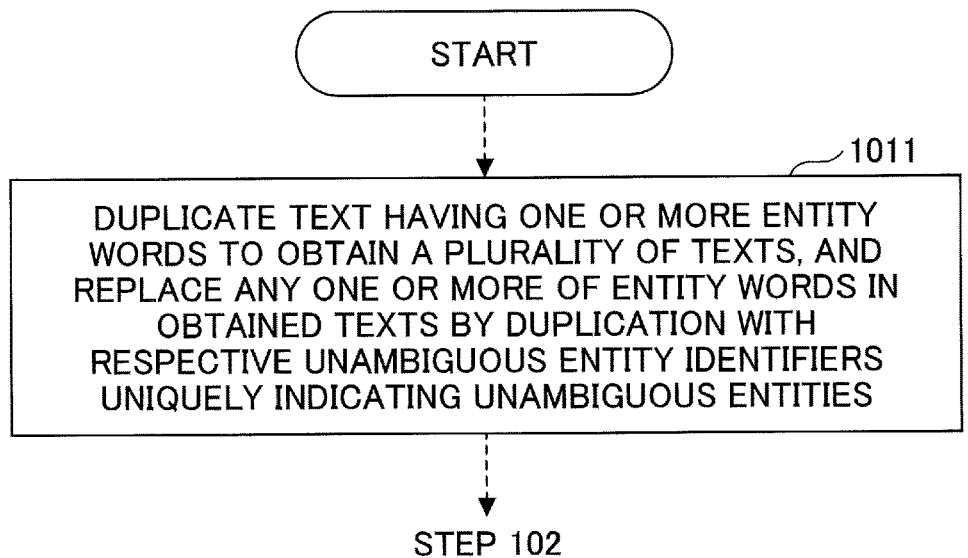
FIG. 2 is a flowchart illustrating a method of constructing training data using an existing unambiguous entity database according to the embodiment of the present invention.

As an example, as illustrated in FIG. 2, step 101 includes step 1011.

Step 1011: duplicate a text having one or more entity words to obtain a plurality of texts, and replace any one or more of the entity words in the obtained texts by duplication with respective unambiguous entity identifiers. The unambiguous entity identifiers uniquely indicate respective unambiguous entities.

Figure 3:
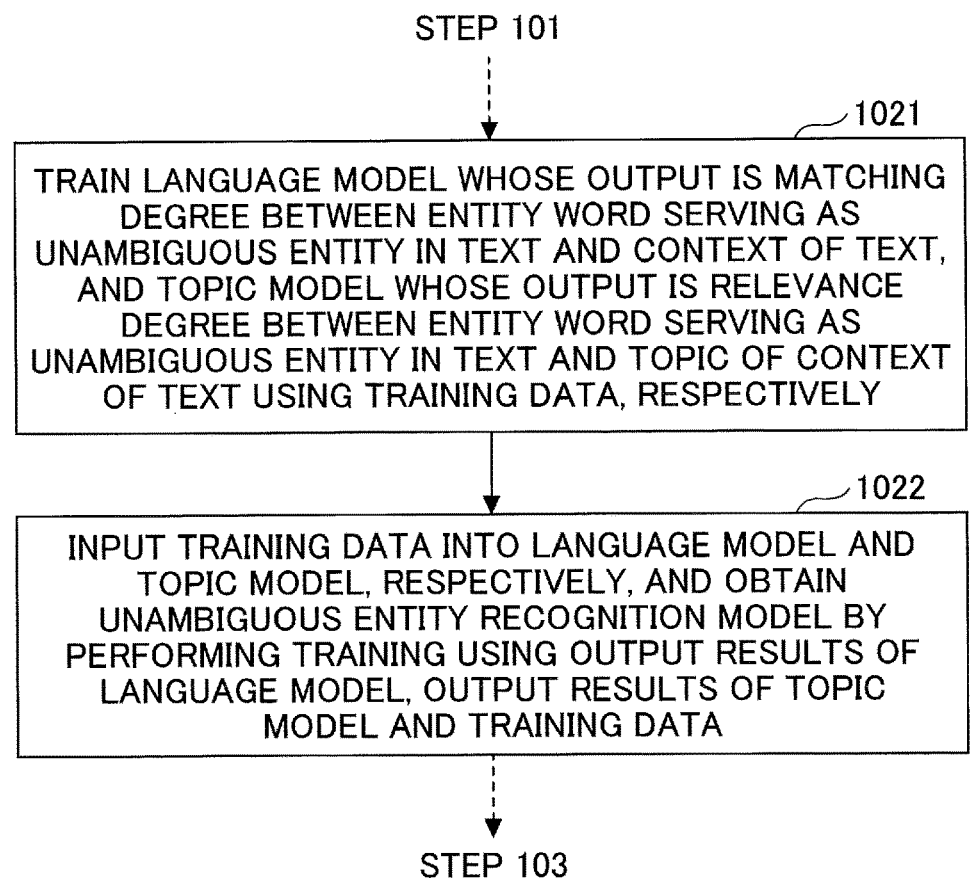
FIG. 3 is a flowchart illustrating a method of training an unambiguous entity recognition model using the training data according to the embodiment of the present invention.

As an example, as illustrated in FIG. 3, step 102 includes steps 1021 and 1022.

Step 1021: train a language model and a topic model using the training data, respectively. The language model can output a matching degree between an entity word serving as an unambiguous entity in a text and a context of the text. The topic model can output a relevance degree between an entity word serving as an unambiguous entity in a text and a topic of a context of the text.

Step 1022: input the training data into the language model and the topic model, respectively, and obtain the unambiguous entity recognition model by performing training using output results of the language model, output results of the topic model and the training data.

Figure 4:
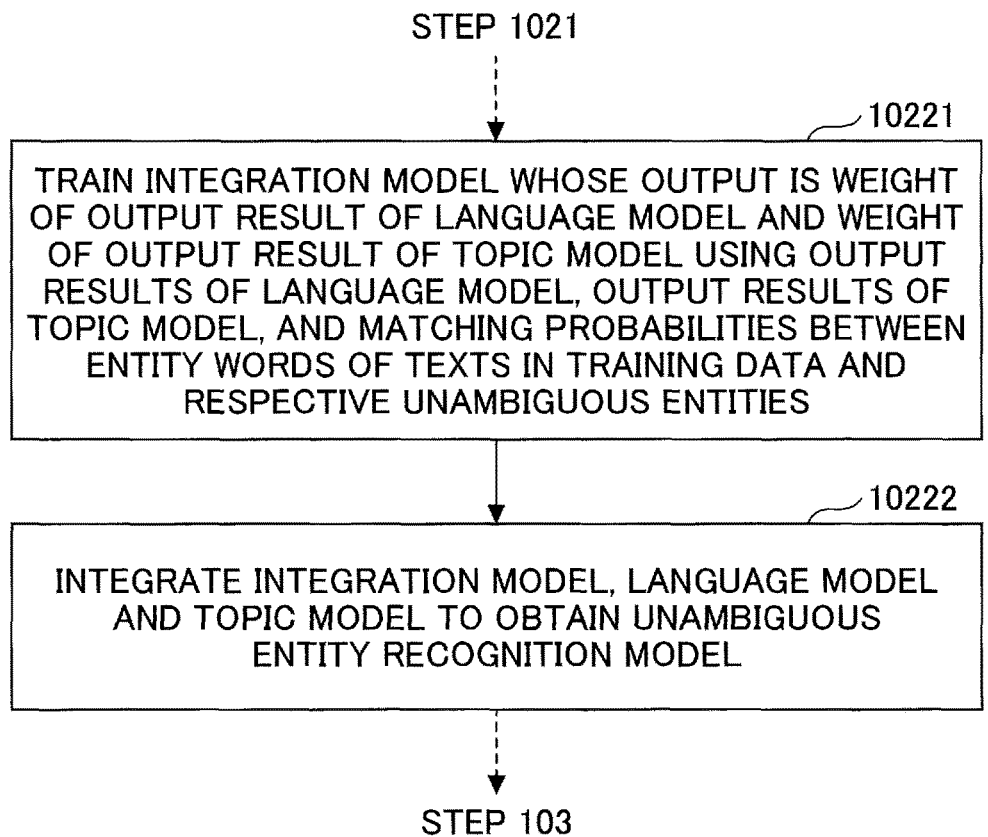
FIG. 4 is a flowchart illustrating a method of obtaining the unambiguous entity recognition model by performing training using output results of a language model, output results of a topic model and the training data according to the embodiment of the present invention.

As an example, as illustrated in FIG. 4, step 1022 includes steps 10221 and 10222.

Step 10221: train an integration model using the output results of the language model, the output results of the topic model, and matching probabilities between the entity words of the texts in the training data and the respective unambiguous entities. The integration model can output a weight of the output result of the language model and a weight of the output result of the topic model.

Step 10222: integrate the integration model, the language model and the topic model to obtain the unambiguous entity recognition model.

Specifically, matching probability p between the entity word and the unambiguous entity output by the unambiguous entity recognition model is expressed by p=a*x+b*y, where a is the weight of the output result of the language model output by the integration model, b is the weight of the output result of the topic model output by the integration model, x is the output result of the language model, and y is the output result of the topic model.

As an example, before obtaining the unambiguous entity recognition model by performing training using the output results of the language model, the output results of the topic model and the training data, the entity linking method further includes expanding the training data using the language model and the topic model.

Specifically, expanding the training data using the language model and the topic model includes at least one of (a) inputting a plurality of sets of unlabeled data including a text having an entity word into the language model, inputting the unlabeled data whose matching degree between the entity word serving as an unambiguous entity in the text and a context of the text output by the language model is greater than a predetermined first threshold into the topic model, adding the unlabeled data whose relevance degree between the entity word serving as an unambiguous entity in the text and a topic of a context of the text output by the topic model is greater than a predetermined second threshold to the training data, and determining unambiguous entity corresponding to the entity word of the added unlabeled data whose relevance degree is greater than the predetermined second threshold as an unambiguous entity linked with the entity word; and (b) inputting a plurality of sets of unlabeled data including a text having an entity word into the topic model, inputting the unlabeled data whose relevance degree between the entity word serving as an unambiguous entity in the text and a topic of a context of the text output by the topic model is greater than a predetermined third threshold into the language model, adding the unlabeled data whose matching degree between the entity word serving as an unambiguous entity in the text and a context of the text output by the language model is greater than a predetermined fourth threshold to the training data, and determining unambiguous entity corresponding to the entity word of the added unlabeled data whose matching degree is greater than the predetermined fourth threshold as an unambiguous entity linked with the entity word.

As an example, determining the unambiguous entity linked with the entity word to be recognized based on the output result of the unambiguous entity recognition model includes determining an unambiguous entity whose matching probability between the entity word and the unambiguous entity is greater than a predetermined fifth threshold as the unambiguous entity linked with the entity word.

In the present embodiment, training data is constructed using an existing unambiguous entity database, the training data includes a plurality of sets of labeled data, and each set of the labeled data includes a text having an entity word and an unambiguous entity linked with the entity word; an unambiguous entity recognition model is trained using the training data, the unambiguous entity recognition model can output a matching probability between an entity word in a text and an unambiguous entity; and a text having an entity word to be recognized is input into the unambiguous entity recognition model, and an unambiguous entity linked with the entity word to be recognized is determined based on an output result of the unambiguous entity recognition model. In this way, the unambiguous entity recognition model can be obtained by training without manual labeling, and an entity word in text information can be linked to an unambiguous entity using the unambiguous entity recognition model. Thus, it is possible to improve the degree of automation of entity linking.

Second Embodiment

Figure 5:
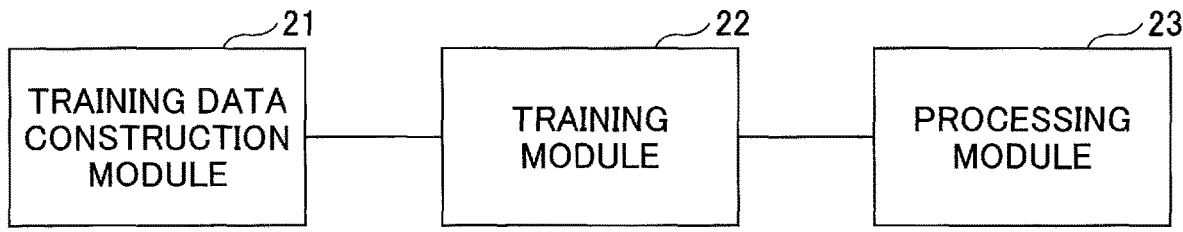
FIG. 5 is a block diagram illustrating a configuration of an entity linking apparatus according to an embodiment of the present invention.

The present embodiment provides an entity linking apparatus. As illustrated in FIG. 5, the entity linking apparatus includes a training data construction module 21, a training module 22 and a processing module 23.

The training data construction module 21 constructs training data using an existing unambiguous entity database. In the existing unambiguous entity database, one or more unambiguous entities corresponding to one or more respective entity words are stored. The training data includes a plurality of sets of labeled data, and each set of the labeled data includes a text having an entity word and an unambiguous entity linked with the entity word.

The training module 22 trains an unambiguous entity recognition model using the training data. The unambiguous entity recognition model can output a matching probability between an entity word in a text and an unambiguous entity.

The processing module 23 inputs a text having an entity word to be recognized into the unambiguous entity recognition model, and determines an unambiguous entity linked with the entity word to be recognized based on an output result of the unambiguous entity recognition model.

In the present embodiment, training data is constructed using an existing unambiguous entity database, the training data includes a plurality of sets of labeled data, and each set of the labeled data includes a text having an entity word and an unambiguous entity linked with the entity word; an unambiguous entity recognition model is trained using the training data, the unambiguous entity recognition model can output a matching probability between an entity word in a text and an unambiguous entity; and a text having an entity word to be recognized is input into the unambiguous entity recognition model, and an unambiguous entity linked with the entity word to be recognized is determined based on an output result of the unambiguous entity recognition model. In this way, the unambiguous entity recognition model can be obtained by training without manual labeling, and an entity word in text information can be linked to an unambiguous entity using the unambiguous entity recognition model. Thus, it is possible to improve the degree of automation of entity linking.

As an example, the training data construction module 21 duplicates a text having one or more entity words to obtain a plurality of texts, and replaces any one or more of the entity words in the obtained texts by duplication with respective unambiguous entity identifiers. The unambiguous entity identifiers uniquely indicate respective unambiguous entities.

As an example, the training module 22 trains a language model and a topic model using the training data, respectively. The language model can output a matching degree between an entity word serving as an unambiguous entity in a text and a context of the text. The topic model can output a relevance degree between an entity word serving as an unambiguous entity in a text and a topic of a context of the text. Then, the training module 22 inputs the training data into the language model and the topic model, respectively, and obtain the unambiguous entity recognition model by performing training using output results of the language model, output results of the topic model and the training data.

As an example, the training module 22 trains an integration model using the output results of the language model, the output results of the topic model, and matching probabilities between the entity words of the texts in the training data and the respective unambiguous entities. The integration model can output a weight of the output result of the language model and a weight of the output result of the topic model. Then, the training module 22 integrates the integration model, the language model and the topic model to obtain the unambiguous entity recognition model.

Specifically, matching probability p between the entity word and the unambiguous entity output by the unambiguous entity recognition model is expressed by $p=a*x+b*y$, where a is the weight of the output result of the language model output by the integration model, b is the weight of the output result of the topic model output by the integration model, x is the output result of the language model, and y is the output result of the topic model.

As an example, the training module 22 further expands the training data using the language model and the topic model, before obtaining the unambiguous entity recognition model by performing training using the output results of the language model, the output results of the topic model and the training data.

As an example, the training module 22 performs at least one of (a) inputting a plurality of sets of unlabeled data including a text having an entity word into the language model, inputting the unlabeled data whose matching degree between the entity word serving as an unambiguous entity in the text and a context of the text output by the language model is greater than a predetermined first threshold into the topic model, adding the unlabeled data whose relevance degree between the entity word serving as an unambiguous entity in the text and a topic of a context of the text output by the topic model is greater than a predetermined second threshold to the training data, and determining unambiguous entity corresponding to the entity word of the added unlabeled data whose relevance degree is greater than the predetermined second threshold as an unambiguous entity linked with the entity word; and (b) inputting a plurality of sets of unlabeled data including a text having an entity word into the topic model, inputting the unlabeled data whose relevance degree between the entity word serving as an unambiguous entity in the text and a topic of a context of the text output by the topic model is greater than a predetermined third threshold into the language model, adding the unlabeled data whose matching degree between the entity word serving as an unambiguous entity in the text and a context of the text output by the language model is greater than a predetermined fourth threshold to the training data, and determining unambiguous entity corresponding to the entity word of the added unlabeled data whose matching degree is greater than the predetermined fourth threshold as an unambiguous entity linked with the entity word.

As an example, the processing module 23 determines an unambiguous entity whose matching probability between the entity word and the unambiguous entity is greater than a predetermined fifth threshold as the unambiguous entity linked with the entity word.

Third Embodiment

Figure 6:
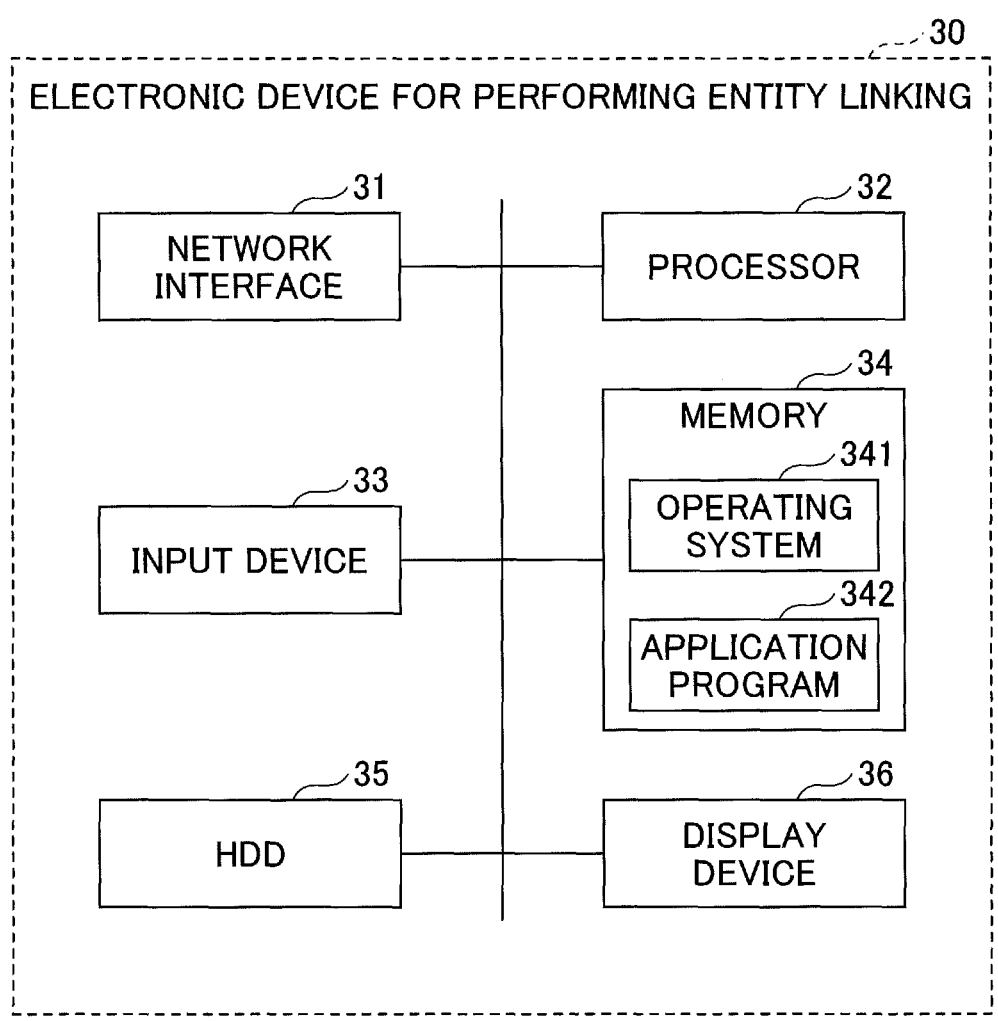
FIG. 6 is a block diagram illustrating a configuration of an electronic device for performing entity linking according to an embodiment of the present invention.

The present embodiment provides an electronic device 30 for performing entity linking. As illustrated in FIG. 6, the electronic device 30 includes a processor 32, and a memory 34 storing computer-readable instructions.

When the computer-readable instructions are executed by the processor 32, the processor 32 constructs, using an existing unambiguous entity database where one or more unambiguous entities corresponding to one or more respective entity words are stored, training data including a plurality of sets of labeled data, each set of the labeled data including a text having an entity word and an unambiguous entity linked with the entity word; trains, using the training data, an unambiguous entity recognition model whose output is a matching probability between an entity word in a text and an unambiguous entity; and inputs a text having an entity word to be recognized into the unambiguous entity recognition model, and determines, based on an output result of the unambiguous entity recognition model, an unambiguous entity linked with the entity word to be recognized.

As illustrated in FIG. 6, the electronic device 30 further includes a network interface 31, an input device 33, a hard disk drive (HDD) 35, and a display device 36.

Each of ports and each of devices may be connected to each other via a bus architecture. The bus architecture may include any number of interconnected buses and bridges. The processor 32 such as one or more central processing units (CPUs), and the memory 34 such as one or more memory units may be connected via various circuits. Other circuits such as an external device, a regulator and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 31 may be connected to a network (such as the Internet, a LAN or the like), obtain related data such as data of the unambiguous entity database, and store the related data in the hard disk drive 35.

The input device 33 may receive various commands input by a user, and transmit the commands to the processor 32 to be executed. The input device 33 may include a keyboard, a click apparatus (such as a mouse or a track ball), a touch board, a touch panel or the like.

The display device 36 may display a result obtained by executing the commands.

The memory 34 stores programs and data required for running an operating system, and data such as intermediate results in calculation processes of the processor 32.

Note that the memory 34 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which used as an external high-speed buffer. The memory 34 of the apparatus or the method described herein includes and is not limited to any other suitable memory.

In some embodiments, the memory 34 stores executable modules or data structure, their subsets, or their superset, i.e., an operating system (OS) 341 and an application program 342.

The operating system 341 includes various system programs for realizing various essential tasks and processing tasks based on hardware, such as a frame layer, a core library layer, a drive layer and the like. The application program 342 includes various application programs for realizing various application tasks, such as a browser and the like. A program for realizing the method according to the embodiments of the present invention may be included in the application program 342.

When the processor 32 invokes and executes the application program and data stored in the memory 34, specifically the program or instructions stored in the application program 342, the processor 32 may construct, using an existing unambiguous entity database where one or more unambiguous entities corresponding to one or more respective entity words are stored, training data including a plurality of sets of labeled data, each set of the labeled data including a text having an entity word and an unambiguous entity linked with the entity word; train, using the training data, an unambiguous entity recognition model whose output is a matching probability between an entity word in a text and an unambiguous entity; and input a text having an entity word to be recognized into the unambiguous entity recognition model, and determine, based on an output result of the unambiguous entity recognition model, an unambiguous entity linked with the entity word to be recognized.

The method according to the above embodiments of the present invention may be applied to the processor 32 or may be realized by the processor 32. The processor 32 may be an integrated circuit chip capable of processing signals. Each step of the above method may be realized by instructions in a form of integrated logic circuit of hardware in the processor 32 or a form of software. The processor 32 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, and alternatively, the processor may be any common processors. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 34, and the processor 32 reads information in the memory 34 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processors (DSP), digital signal processing devices (DSPD), programmable logic devices (PLD), field programmable gate array signals (FPGA), general-purpose processors, controllers, micro-controllers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Specifically, the processor 32 duplicates a text having one or more entity words to obtain a plurality of texts; and replaces any one or more of the entity words in the obtained texts by duplication with respective unambiguous entity identifiers uniquely indicating unambiguous entities.

Specifically, the processor 32 trains, using the training data, a language model whose output is a matching degree between an entity word serving as an unambiguous entity in a text and a context of the text, and a topic model whose output is a relevance degree between an entity word serving as an unambiguous entity in a text and a topic of a context of the text, respectively; and inputs the training data into the language model and the topic model, respectively, and obtains the unambiguous entity recognition model by performing training using output results of the language model, output results of the topic model and the training data.

Specifically, the processor 32 trains, using the output results of the language model, the output results of the topic model, and matching probabilities between the entity words of the texts in the training data and the respective unambiguous entities, an integration model whose output is a weight of the output result of the language model and a weight of the output result of the topic model; and integrates the integration model, the language model and the topic model to obtain the unambiguous entity recognition model.

Specifically, matching probability p between the entity word and the unambiguous entity output by the unambiguous entity recognition model is expressed by $p=a*x+b*y$, where a is the weight of the output result of the language model output by the integration model, b is the weight of the output result of the topic model output by the integration model, x is the output result of the language model, and y is the output result of the topic model.

Specifically, the processor 32 expands the training data using the language model and the topic model, before obtaining the unambiguous entity recognition model by performing training using the output results of the language model, the output results of the topic model and the training data.

Specifically, the processor 32 performs at least one of (a) inputting a plurality of sets of unlabeled data including a text having an entity word into the language model, inputting the unlabeled data whose matching degree between the entity word serving as an unambiguous entity in the text and a context of the text output by the language model is greater than a predetermined first threshold into the topic model, adding the unlabeled data whose relevance degree between the entity word serving as an unambiguous entity in the text and a topic of a context of the text output by the topic model is greater than a predetermined second threshold to the training data, and determining unambiguous entity corresponding to the entity word of the added unlabeled data whose relevance degree is greater than the predetermined second threshold as an unambiguous entity linked with the entity word; and (b) inputting a plurality of sets of unlabeled data including a text having an entity word into the topic model, inputting the unlabeled data whose relevance degree between the entity word serving as an unambiguous entity in the text and a topic of a context of the text output by the topic model is greater than a predetermined third threshold into the language model, adding the unlabeled data whose matching degree between the entity word serving as an unambiguous entity in the text and a context of the text output by the language model is greater than a predetermined fourth threshold to the training data, and determining unambiguous entity corresponding to the entity word of the added unlabeled data whose matching degree is greater than the predetermined fourth threshold as an unambiguous entity linked with the entity word.

Specifically, the processor 32 determines an unambiguous entity whose matching probability between the entity word and the unambiguous entity is greater than a predetermined fifth threshold as the unambiguous entity linked with the entity word.

In the present embodiment, training data is constructed using an existing unambiguous entity database, the training data includes a plurality of sets of labeled data, and each set of the labeled data includes a text having an entity word and an unambiguous entity linked with the entity word; an unambiguous entity recognition model is trained using the training data, the unambiguous entity recognition model can output a matching probability between an entity word in a text and an unambiguous entity; and a text having an entity word to be recognized is input into the unambiguous entity recognition model, and an unambiguous entity linked with the entity word to be recognized is determined based on an output result of the unambiguous entity recognition model. In this way, the unambiguous entity recognition model can be obtained by training without manual labeling, and an entity word in text information can be linked to an unambiguous entity using the unambiguous entity recognition model. Thus, it is possible to improve the degree of automation of entity linking.

Fourth Embodiment

The present embodiment provides a non-transitory computer-readable recording medium having computer-executable instructions for execution by a processing system. When the computer-executable instructions are executed, the computer-executable instructions cause the processing system to carry out an entity linking method. The entity linking method includes constructing, using an existing unambiguous entity database where one or more unambiguous entities corresponding to one or more respective entity words are stored, training data including a plurality of sets of labeled data, each set of the labeled data including a text having an entity word and an unambiguous entity linked with the entity word; training, using the training data, an unambiguous entity recognition model whose output is a matching probability between an entity word in a text and an unambiguous entity; and inputting a text having an entity word to be recognized into the unambiguous entity recognition model, and determining, based on an output result of the unambiguous entity recognition model, an unambiguous entity linked with the entity word to be recognized.

Fifth Embodiment

Figure 7:
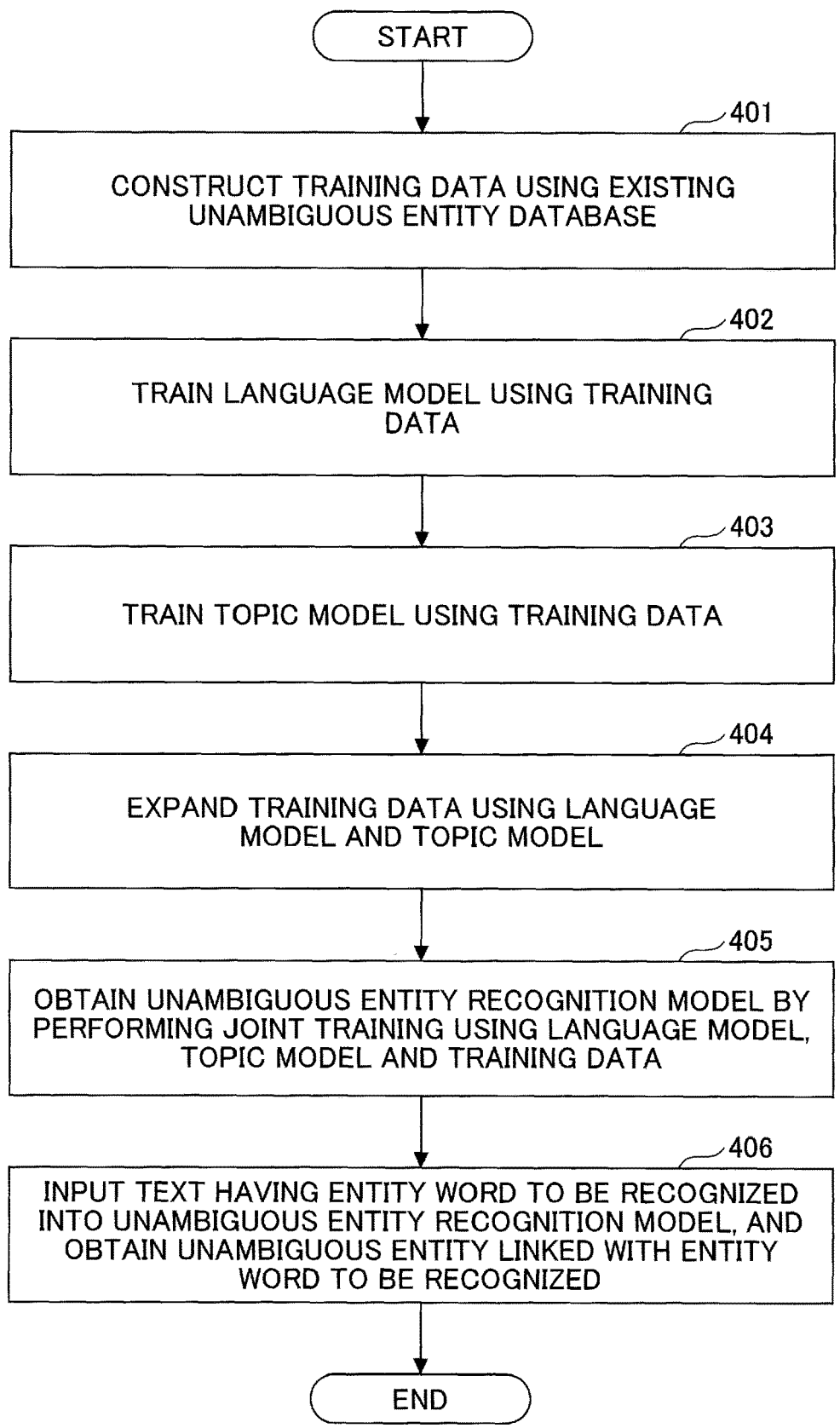
FIG. 7 is a flowchart illustrating an entity linking method according to a specific embodiment of the present invention.

In the following, a specific example of an entity linking method according to an embodiment of the present invention will be described in detail with reference to the accompanying drawings. As illustrated in FIG. 7, an entity linking method according to an embodiment of the present invention may include steps 401 to 406.

Step 401: construct training data using an existing unambiguous entity database.

Here, the existing unambiguous entity database may be an Internet semantic knowledge base such as the Wikipedia and the Baidu Encyclopedia (the Baidu Baike), and may also be other types of databases. A large amount of texts are stored in the existing unambiguous entity database, each of the texts has one or more entity words, and each of the entity words can link to an unambiguous entity.

Figure 8:
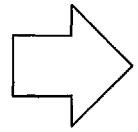
FIG. 8 is a schematic diagram illustrating a method of constructing training data using one text in an unambiguous entity database according to the embodiment of the present invention.

The training data may be constructed using at least of one text in the unambiguous entity database. In the following, as an example, a method of constructing the training data using one text in the unambiguous entity database will be described. As illustrated in FIG. 8, a text in the unambiguous entity database includes a plurality of entity words, namely "multinational", "electronics" and "company". The text is duplicated to obtain a plurality of texts, and any one or more of the entity words in the obtained texts by duplication are replaced with respective unambiguous entity identifiers. The unambiguous entity identifiers may uniquely indicate respective unambiguous entities. For example, "E0001" uniquely indicates an unambiguous entity corresponding to "multinational", "E0002" uniquely indicates an unambiguous entity corresponding to "electronics", and "E0003" uniquely indicates an unambiguous entity corresponding to "company".

A large amount of training data can be obtained by performing the above operations on each of the texts in the unambiguous entity database.

Step 402: train a language model using the training data.

A large amount of training data is input into the language model to train the language model. The language model can output a matching degree between an entity word serving as an unambiguous entity in a text and a context of the text. For example, for text "Apple packed an AI chip into the iPhone X", the language model may output a matching degree between entity word "Apple" in the text and a context of the text. As another example, for the text illustrated in FIG. 8, the language model may output 1 as a matching degree between entity word "multinational" in the text and a context of the text, when entity word "multinational" is unambiguous entity E0001; the language model may output 0 as a matching degree between entity word "multinational" and the context of the text, when entity word "multinational" is unambiguous entity E0002; and the language model may output 0 as a matching degree between entity word "multinational" and the context of the text, when entity word "multinational" is unambiguous entity E0003. Note that a value of a matching degree between an entity word serving as an unambiguous entity in a text and a context of the text is not limited to 0 and 1, and may also be other values between 0 and 1.

Step 403: train a topic model using the training data.

A large amount of training data is input into the topic model to train the topic model. The topic model can output a relevance degree between an entity word serving as an unambiguous entity in a text and a topic of a context of the text. For example, for text "Apple packed an AI chip into the iPhone X", the topic model may output a relevance degree between entity word "Apple" in the text and topics "Apple (fruit)" and "iPhone". As another example, for the text illustrated in FIG. 8, the topic model may output 1 as a relevance degree between entity word "multinational" in the text and a topic of a context of the text, when entity word "multinational" is unambiguous entity E0001; the topic model may output 0 as a relevance degree between entity word "multinational" and the topic of the context of the text, when entity word "multinational" is unambiguous entity E0002; and the topic model may output 0 as a relevance degree between entity word "multinational" and the topic of the context of the text, when entity word "multinational" is unambiguous entity E0003. Note that a value of a relevance degree between an entity word serving as an unambiguous entity in a text and a topic of a context of the text is not limited to 0 and 1, and may also be other values between 0 and 1.

Step 404: expand training data using the language model and the topic model.

The above training data constructed using the unambiguous entity database is initially labeled data, namely entity words in the text have linked to respective unambiguous entities. In order to improve the accuracy of the model, the training data may be expanded using the language model, the topic model, and a large amount of unlabeled data.

Figure 9A:
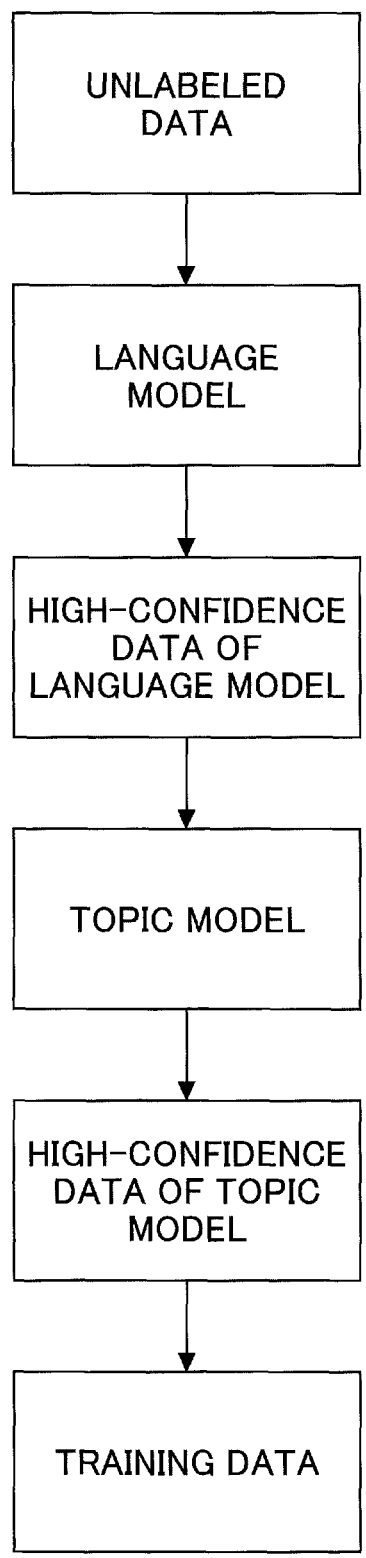
FIG. 9A is a schematic diagram illustrating a method of expanding the training data using a language model and a topic model according to the embodiment of the present invention.

Specifically, as illustrated in FIG. 9A, a plurality of sets of unlabeled data may be input into the language model. Each set of unlabeled data includes a text having an entity word that does not link to an unambiguous entity. Then, the unlabeled data whose matching degree between the entity word serving as an unambiguous entity in the text and a context of the text output by the language model is greater than a predetermined first threshold may be input, as high-confidence data, into the topic model. Then, the unlabeled data whose relevance degree between the entity word serving as an unambiguous entity in the text and a topic of a context of the text output by the topic model is greater than a predetermined second threshold may be added, as high-confidence data, to the training data. In the newly added training data, the unambiguous entity corresponding to the entity word in the text whose relevance degree output by the topic model is greater than the predetermined second threshold may be determined as an unambiguous entity linked with the entity word.

Figure 9B:
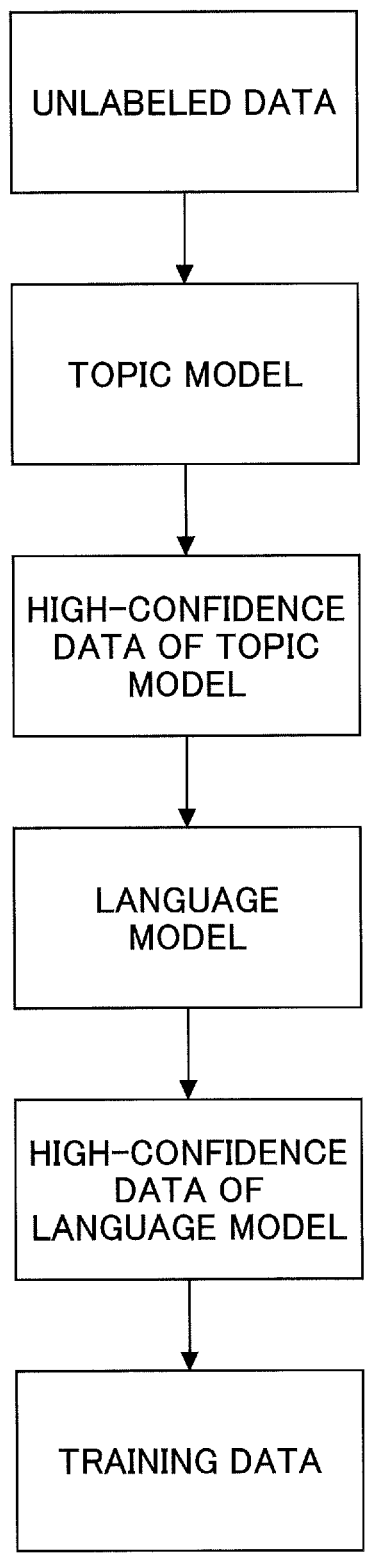
FIG. 9B is a schematic diagram illustrating another method of expanding the training data using the language model and the topic model according to the embodiment of the present invention.

Alternatively, as illustrated in FIG. 9B, a plurality of sets of unlabeled data may also be input into the topic model. Each set of unlabeled data includes a text having an entity word that does not link to an unambiguous entity. Then, the unlabeled data whose relevance degree between the entity word serving as an unambiguous entity in the text and a topic of a context of the text output by the topic model is greater than a predetermined third threshold may be input, as high-confidence data, into the language model. Then, the unlabeled data whose matching degree between the entity word serving as an unambiguous entity in the text and a context of the text output by the language model is greater than a predetermined fourth threshold may be added, as high-confidence data, to the training data. In the newly added training data, the unambiguous entity corresponding to the entity word in the text whose matching degree output by the language model is greater than the predetermined fourth threshold may be determined as an unambiguous entity linked with the entity word.

As illustrated in FIG. 9A and FIG. 9B, new labeled data can be generated by alternately training a large amount of unlabeled data using the language model and the topic model, and can be added to the training data. Thus, manual labeling can be eliminated, labor costs can be reduced, and the degree of automation of model training can be improved.

Step 405: obtain an unambiguous entity recognition model by performing joint training using the language model, the topic model and the training data.

First, an integration model is trained using the output results of the language model, the output results of the topic model, and matching probabilities between the entity words of the texts in the training data and the respective unambiguous entities. The integration model can output a weight of the output result of the language model and a weight of the output result of the topic model. For example, a matching probability between an entity word of a text in the training data and an unambiguous entity is expressed by M, an output result when inputting the text into the language model is expressed by x, and an output result when inputting the text into the topic model is expressed by y. The integration model is trained using (M, x, y) serving as training data of the integration model, values of a and b are continuously adjusted by the integration model using a large amount of training data so that a value of $a*x+b*y$ finally approaches M, where a is the weight of the output result of the language model output by the integration model, and b is the weight of the output result of the topic model output by the integration model.

After training the integration model, the integration model, the language model and the topic model may be integrated to obtain the unambiguous entity recognition model. The unambiguous entity recognition model can output a matching probability between an entity word in a text and an unambiguous entity. After inputting a text having an entity word to be recognized into the unambiguous entity recognition model, matching probabilities p between the entity word to be recognized and one or more unambiguous entities are output, $p=a*x+b*y$, where a is a weight of an output result of the language model output by the trained integration model, b is a weight of an output result of the topic model output by the trained integration model, x is an output result obtained by inputting the text having the entity word to be recognized into the language model, and y is an output result obtained by inputting the text having the entity word to be recognized into the topic model.

Step 406: input the text having the entity word to be recognized into the unambiguous entity recognition model, and obtain an unambiguous entity linked with the entity word to be recognized.

Specifically, the text having the entity word to be recognized may be input into the unambiguous entity recognition model to obtain matching probabilities between the entity word and one or more unambiguous entities, and an unambiguous entity with a highest matching probability may be selected as the unambiguous entity linked with the entity word. Alternatively, it may be determined whether the obtained highest matching probability is greater than a predetermined fifth threshold, and the unambiguous entity with the highest matching probability may be selected as the unambiguous entity linked with the entity word when the highest matching probability is greater than the predetermined fifth threshold.

In the present embodiment, training data is constructed using an existing unambiguous entity database, the training data includes a plurality of sets of labeled data, and each set of the labeled data includes a text having an entity word and an unambiguous entity linked with the entity word; an unambiguous entity recognition model is trained using the training data, the unambiguous entity recognition model can output a matching probability between an entity word in a text and an unambiguous entity; and a text having an entity word to be recognized is input into the unambiguous entity recognition model, and an unambiguous entity linked with the entity word to be recognized is determined based on an output result of the unambiguous entity recognition model. In this way, the unambiguous entity recognition model can be obtained by training without manual labeling, and an entity word in text information can be linked to an unambiguous entity using the unambiguous entity recognition model. Thus, it is possible to improve the degree of automation of entity linking.

The present invention is not limited to the specifically disclosed embodiments, and various modifications, combinations and replacements may be made without departing from the scope of the present invention.

What is claimed is:

1. An entity linking method comprising:
   constructing, using an existing unambiguous entity database where one or more unambiguous entities corresponding to one or more respective entity words are stored, training data including a plurality of sets of labeled data, each set of the labeled data including a text having an entity word and an unambiguous entity linked with the entity word;
   training, using the training data, an unambiguous entity recognition model whose output is a matching probability between an entity word in a text and an unambiguous entity; and
   inputting a text having an entity word to be recognized into the unambiguous entity recognition model, and determining, based on an output result of the unambiguous entity recognition model, an unambiguous entity linked with the entity word to be recognized,
   wherein the construction of the training data includes duplicating a text having one or more entity words to obtain a plurality of texts; and
   replacing any one or more of the entity words in the obtained texts by duplication with respective unambiguous entity identifiers uniquely indicating unambiguous entities.

2. The entity linking method according to claim 1, wherein training the unambiguous entity recognition model using the training data includes
   training, using the training data, a language model whose output is a matching degree between an entity word serving as an unambiguous entity in a text and a context of the text, and a topic model whose output is a relevance degree between an entity word serving as an unambiguous entity in a text and a topic of a context of the text, respectively; and
   inputting the training data into the language model and the topic model, respectively, and obtaining the unambiguous entity recognition model by performing training using output results of the language model, output results of the topic model and the training data.

3. The entity linking method according to claim 2, wherein obtaining the unambiguous entity recognition model by performing training using the output results of the language model, the output results of the topic model and the training data includes
   training, using the output results of the language model, the output results of the topic model, and matching probabilities between the entity words of the texts in the training data and the respective unambiguous entities, an integration model whose output is a weight of the output result of the language model and a weight of the output result of the topic model; and integrating the integration model, the language model and the topic model to obtain the unambiguous entity recognition model.

4. entity linking method according to claim 3, wherein matching probability p between the entity word and the unambiguous entity output by the unambiguous entity recognition model is expressed by $p=a*x+b*y$, where a is the weight of the output result of the language model output by the integration model, b is the weight of the output result of the topic model output by the integration model, x is the output result of the language model, and y is the output result of the topic model.

5. The entity linking method according to claim 2, further comprising:

expanding the training data using the language model and the topic model, before obtaining the unambiguous entity recognition model by performing training using the output results of the language model, the output results of the topic model and the training data.

6. The entity linking method according to claim 5, wherein expanding the training data using the language model and the topic model includes at least one of inputting a plurality of sets of unlabeled data including a text having an entity word into the language model, inputting the unlabeled data whose matching degree between the entity word serving as an unambiguous entity in the text and a context of the text output by the language model is greater than a predetermined first threshold into the topic model, adding the unlabeled data whose relevance degree between the entity word serving as an unambiguous entity in the text and a topic of a context of the text output by the topic model is greater than a predetermined second threshold to the training data, and determining unambiguous entity corresponding to the entity word of the added unlabeled data whose relevance degree is greater than the predetermined second threshold as an unambiguous entity linked with the entity word; and inputting a plurality of sets of unlabeled data including a text having an entity word into the topic model, inputting the unlabeled data whose relevance degree between the entity word serving as an unambiguous entity in the text and a topic of a context of the text output by the topic model is greater than a predetermined third threshold into the language model, adding the unlabeled data whose matching degree between the entity word serving as an unambiguous entity in the text and a context of the text output by the language model is greater than a predetermined fourth threshold to the training data, and determining unambiguous entity corresponding to the entity word of the added unlabeled data whose matching degree is greater than the predetermined fourth threshold as an unambiguous entity linked with the entity word.

7. The entity linking method according to claim 1, wherein determining the unambiguous entity linked with the entity word to be recognized based on the output result of the unambiguous entity recognition model includes determining an unambiguous entity whose matching probability between the entity word and the unambiguous entity is greater than a predetermined fifth threshold as the unambiguous entity linked with the entity word.

8. An electronic device for performing entity linking, the electronic device comprising:

a memory storing computer-readable instructions; and one or more processors configured to execute the computer-readable instructions such that the one or more processors are configured to construct, using an existing unambiguous entity database where one or more unambiguous entities corresponding to one or more respective entity words are stored, training data including a plurality of sets of labeled data, each set of the labeled data including a text having an entity word and an unambiguous entity linked with the entity word;

train, using the training data, an unambiguous entity recognition model whose output is a matching probability between an entity word in a text and an unambiguous entity; and input a text having an entity word to be recognized into the unambiguous entity recognition model, and determine, based on an output result of the unambiguous entity recognition model, an unambiguous entity linked with the entity word to be recognized, wherein the one or more processors are configured to construct the training data by duplicating a text having one or more entity words to obtain a plurality of texts; and replacing any one or more of the entity words in the obtained texts by duplication with respective unambiguous entity identifiers uniquely indicating unambiguous entities.

9. The electronic device for performing entity linking according to claim 8, wherein the one or more processors are configured to train, using the training data, a language model whose output is a matching degree between an entity word serving as an unambiguous entity in a text and a context of the text, and a topic model whose output is a relevance degree between an entity word serving as an unambiguous entity in a text and a topic of a context of the text, respectively; and input the training data into the language model and the topic model, respectively, and obtain the unambiguous entity recognition model by performing training using output results of the language model, output results of the topic model and the training data.

10. The electronic device for performing entity linking according to claim 9, wherein the one or more processors are configured to train, using the output results of the language model, the output results of the topic model, and matching probabilities between the entity words of the texts in the training data and the respective unambiguous entities, an integration model whose output is a weight of the output result of the language model and a weight of the output result of the topic model, and integrate the integration model, the language model and the topic model to obtain the unambiguous entity recognition model.

11. The electronic device for performing entity linking according to claim 10, wherein matching probability p between the entity word and the unambiguous entity output by the unambiguous entity recognition model is expressed by $p=a*x+b*y$, where a is the weight of the output result of the language model output by the integration model, b is the weight of the output result of the topic model output by the integration model, x is the output result of the language model, and y is the output result of the topic model.

12. The electronic device for performing entity linking according to claim 9, wherein the one or more processors are further configured to expand the training data using the language model and the topic model, before obtaining the unambiguous entity recognition model by performing training using the output results of the language model, the output results of the topic model and the training data.

13. The electronic device for performing entity linking according to claim 12, wherein the one or more processors are configured to perform at least one of inputting a plurality of sets of unlabeled data including a text having an entity word into the language model, inputting the unlabeled data whose matching degree between the entity word serving as an unambiguous entity in the text and a context of the text output by the language model is greater than a predetermined first threshold into the topic model, adding the unlabeled data whose relevance degree between the entity word serving as an unambiguous entity in the text and a topic of a context of the text output by the topic model is greater than a predetermined second threshold to the training data, and determining unambiguous entity corresponding to the entity word of the added unlabeled data whose relevance degree is greater than the predetermined second threshold as an unambiguous entity linked with the entity word; and inputting a plurality of sets of unlabeled data including a text having an entity word into the topic model, inputting the unlabeled data whose relevance degree between the entity word serving as an unambiguous entity in the text and a topic of a context of the text output by the topic model is greater than a predetermined third threshold into the language model, adding, the unlabeled data whose matching degree between the entity word serving as an unambiguous entity in the text and a context of the text output by the language model is greater than a predetermined fourth threshold to the training data, and determining unambiguous entity corresponding to the entity word of the added unlabeled data whose matching degree is greater than the predetermined fourth threshold as an unambiguous entity linked with the entity word.

14. The electronic device for performing entity linking according to claim 8, wherein the one or more processors are configured to determine an unambiguous entity whose matching probability between the entity word and the unambiguous entity is greater than a predetermined fifth threshold as the unambiguous entity linked with the entity word.

15. A non-transitory computer-readable recording medium having computer-executable instructions for execution by a processing system, wherein, the computer-executable instructions, when executed, cause the processing system to carry out an entity linking method comprising:

constructing, using an existing unambiguous entity database where one or more unambiguous entities corresponding to one or more respective entity words are stored, training data including a plurality of sets of labeled data, each set of the labeled data including a text having an entity word and an unambiguous entity linked with the entity word;

training, using the training data, an unambiguous entity recognition model whose output is a matching probability between an entity word in a text and an unambiguous entity; and inputting a text having an entity word to be recognized into the unambiguous entity recognition model, and determining, based on an output result of the unambiguous entity recognition model, an unambiguous entity linked with the entity word to be recognized, wherein the training data is constructed by duplicating a text having one or more entity words to obtain a plurality of texts; and replacing any one or more of the entity words in the obtained texts by duplication with respective unambiguous entity identifiers uniquely indicating unambiguous entities.

\* \* \* \* \*